United States Patent
Fenech et al.

(10) Patent No.: US 7,869,802 B2
(45) Date of Patent: Jan. 11, 2011

(54) UPLINK FREQUENCY MULTIPLEXING SYSTEM

(75) Inventors: Hector Fenech, Issy les Moulineaux (FR); Emmanuel Lance, Clichy (FR)

(73) Assignee: Eutelsat SA, Paris (FR)

( * ) Notice: Subject to any disclaimer, the term of this patent is extended or adjusted under 35 U.S.C. 154(b) by 505 days.

(21) Appl. No.: 12/039,169

(22) Filed: Feb. 28, 2008

(65) Prior Publication Data

US 2008/0207118 A1   Aug. 28, 2008

(30) Foreign Application Priority Data

Feb. 28, 2007   (EP) .................. 07290256

(51) Int. Cl.
*H04W 4/00* (2009.01)
(52) U.S. Cl. ...................... 455/427; 342/368
(58) Field of Classification Search .......... 455/427, 455/12.1, 3.02; 342/356, 368
See application file for complete search history.

(56) References Cited

U.S. PATENT DOCUMENTS

| | | | |
|---|---|---|---|
| 4,931,802 A * | 6/1990 | Assal et al. .............. 342/356 |
| 5,033,108 A | 7/1991 | Lockwood | |
| 6,173,155 B1 | 1/2001 | Norin | |
| 6,571,081 B1 | 5/2003 | Reinhardt | |
| 6,606,055 B2 * | 8/2003 | Halsema et al. ............. 342/368 |

FOREIGN PATENT DOCUMENTS

| | | |
|---|---|---|
| EP | 0 355 985 A3 | 2/1990 |
| EP | 0 910 179 A2 | 4/1999 |
| EP | 1 050 926 A2 | 11/2000 |
| FR | 2783377 A1 | 3/2000 |

* cited by examiner

*Primary Examiner*—Tu X Nguyen
(74) *Attorney, Agent, or Firm*—Leydig, Voit & Mayer, Ltd.

(57) ABSTRACT

A satellite-borne transponder for two or more uplink service areas, includes uplink antennae, a low noise amplifier and a converter for each uplink antenna, input filters, amplification chains, each amplification chain including a channel amplifier, a high power amplifier, and an output filter, and a downlink antenna for an associated downlink service area. The transponder associates uplink antennae to an uplink service area, the number of antennae being determined by a preset Figure of Merit for each uplink service area. The transponder also includes at least one input multiplexer including a passband filter for each reception chains, each reception chain including an uplink antenna, a low noise amplifier, and a converter linked to the multiplexer.

9 Claims, 4 Drawing Sheets

UPLINK FREQUENCY MULTIPLEXING SYSTEM

FIELD OF THE INVENTION

Figure 1:
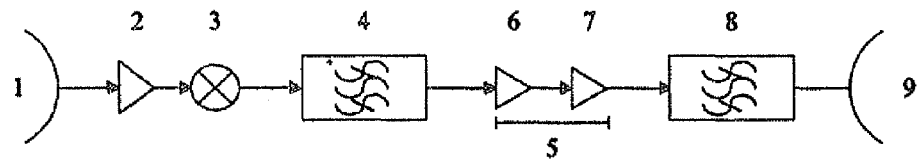

The invention relates to a satellite transponder for two or more uplink service areas and a satellite communication system comprising such a transponder.

In order to avoid any misunderstanding, it is specified that the present invention relates to a satellite-borne transponder for two or more uplink service areas and a satellite communication system comprising such a satellite-borne transponder, even if sometimes it is written "satellite transponder" or "transponder" only.

BACKGROUND

Traditionally, each transponder is associated with a single uplink service area and a single downlink service area. The disadvantage of such a scheme is that if traffic exists from two or more service areas to a given service area, several transponders are required for connectivity purposes, even if the total required capacity is compatible with that of a single transponder. This does not represent efficient or optimal use of the satellite resources, in terms of Radio Frequency resources (bandwidth) and power resources. Also, a conventional architecture associating a transponder with multiple service areas degrades the figure of merit (also called G/T) which, in the present case, is the relationship between the gain G of the antenna and the noise temperature T over the uplink service areas.

Additionally as the uplink service area increases in area the figure of merit G/T decreases.

SUMMARY OF THE INVENTION

The object of the present invention is to satisfy the connectivity requirements while maintaining efficient and optimal use of satellite resources, particularly of the high power section of the payload and the bandwidth occupancy, with no degradation of the satellite figure of merit over the uplink service areas.

A further object of the invention is to allow the increase of the uplink service area while maintaining the G/T performance.

The present invention solves this problem by means of a specific setup or combination of conventional equipment: a satellite-borne transponder for two or more uplink service areas, comprising two or more uplink antennae, one low noise amplifier and one converter for each uplink antenna, one or more input filters, one or more amplification chains including a channel amplifier and a high power amplifier, and an output filter and a downlink antenna for an associated downlink service area.

According to the invention, the satellite-borne transponder comprises means for associating one or more of the two or more uplink antennae to an uplink service area, the precise number being determined by a preset Figure of Merit over each associated uplink service area, the transponder further comprising at least one input multiplexer including at least as many passband filters as reception chains including an uplink antenna and a subsequent low noise amplifier and a converter are linked to that input multiplexer, each one of the filters having a passband adjusted to an associated uplink service area and one or several stopbands associated to the others service areas.

The invention makes use of passive components and does not increase significantly the power consumption and the dissipation on-board the satellite with respect to a conventional payload. The invention requires adaptation in the input section, but does not imply any significant development since it can be implemented using conventional equipment.

The satellite transponder offers thus the possibility to multiplex signals uplinked from different service areas into a single transponder using a simple technique, with no degradation of the figure of merit over each uplink service area.

Particularly, the invention allows the system to be extended with different combinations of filters at the input multiplexer so that the passband associated to each uplink service area can be adjusted to fit varying commercial and marketing requirements throughout the satellite lifetime.

The system can also be employed to segment a given uplink service area into several sub areas, each sub area benefiting from an increased antenna gain and thus a better figure of merit G/T. The G/T can be adjusted to the actual needs of different parts of a given area, at no detriment to the power and frequency resources.

BRIEF DESCRIPTION OF DRAWING FIGURES

Figure 2:
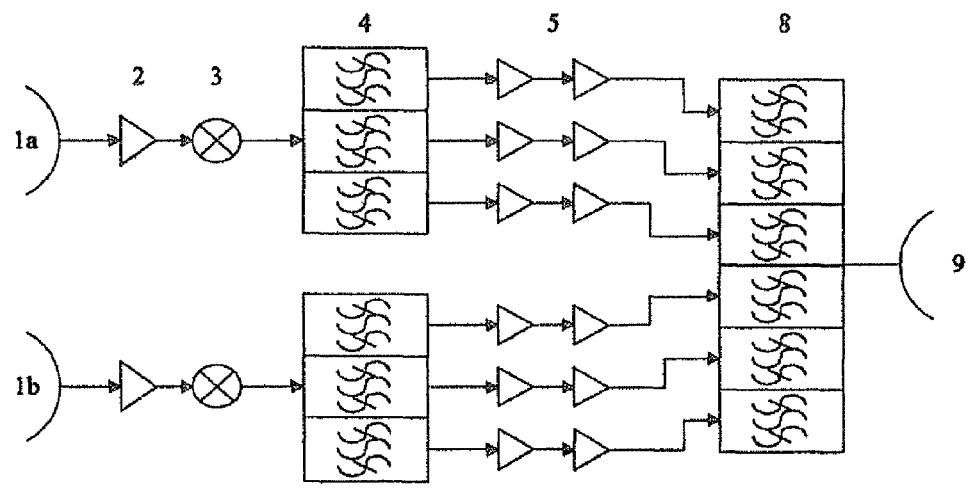
Figure 3:
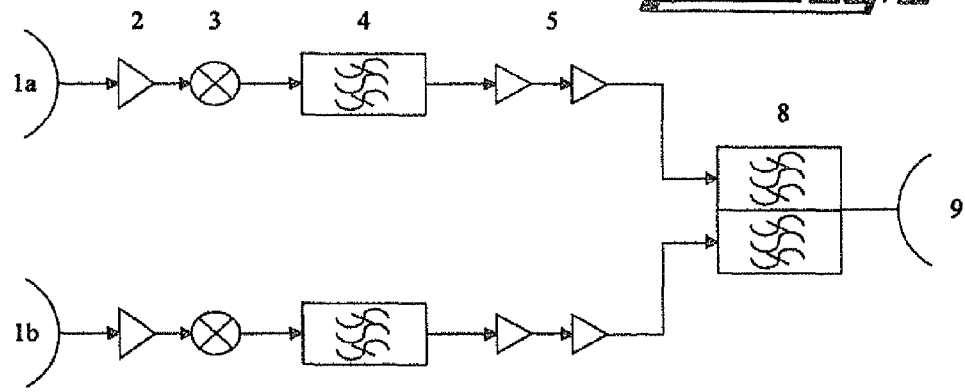
Figure 4:
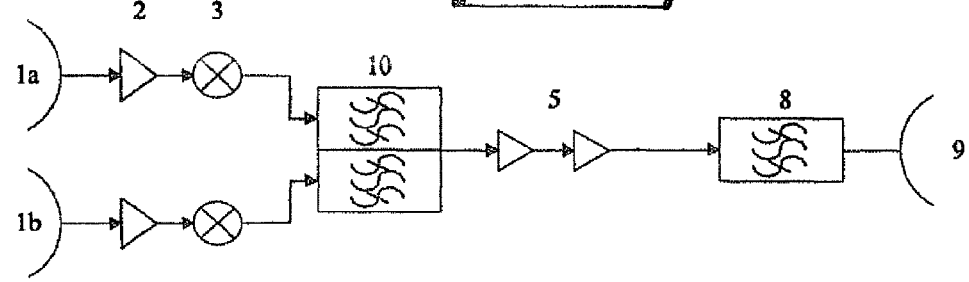
Figure 5:
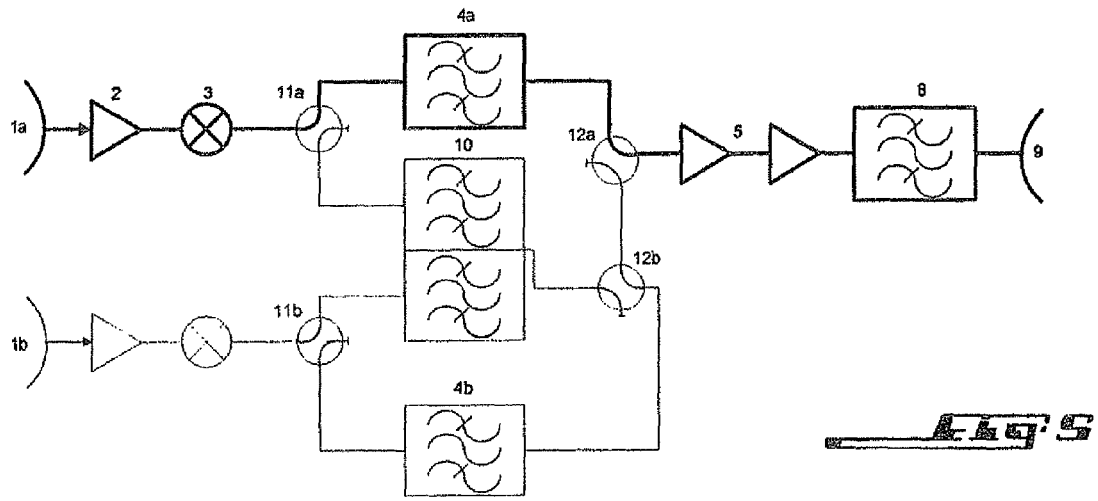
Figure 6:
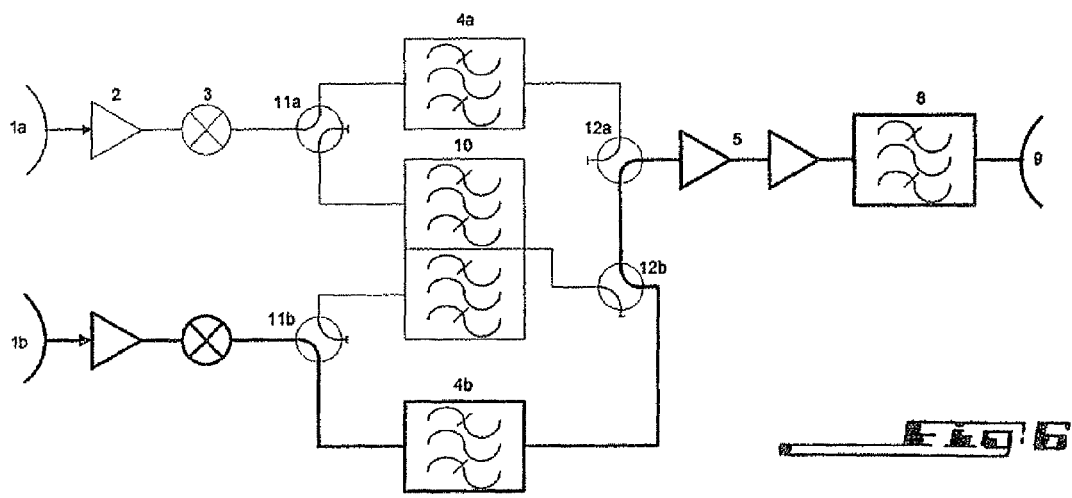
Figure 7:
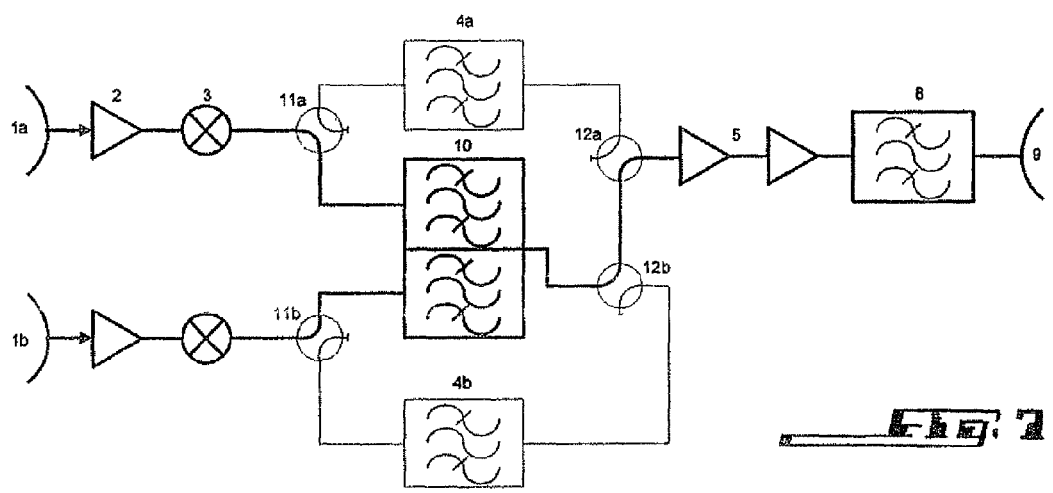
Figure 8:
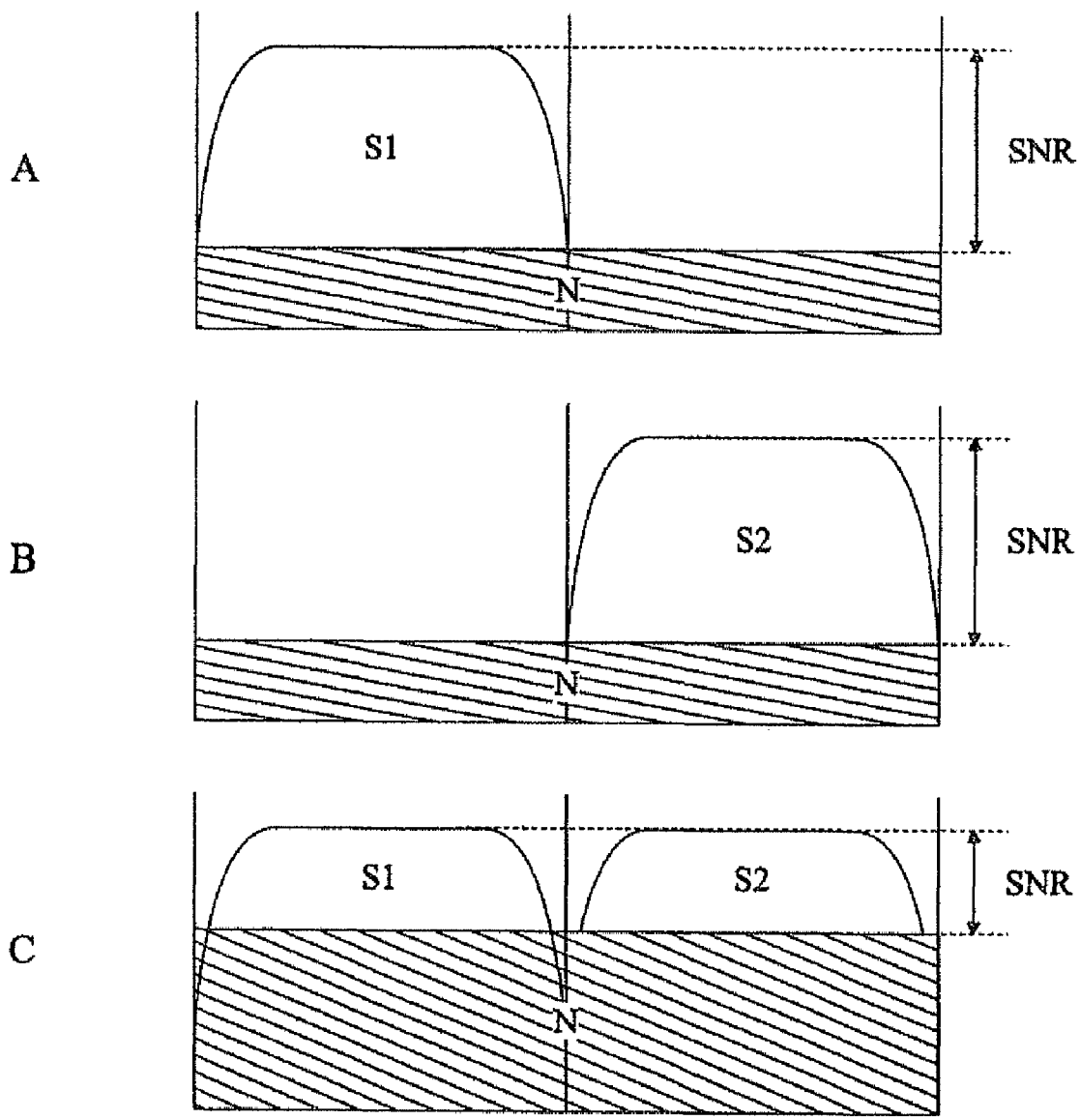
Figure 9:
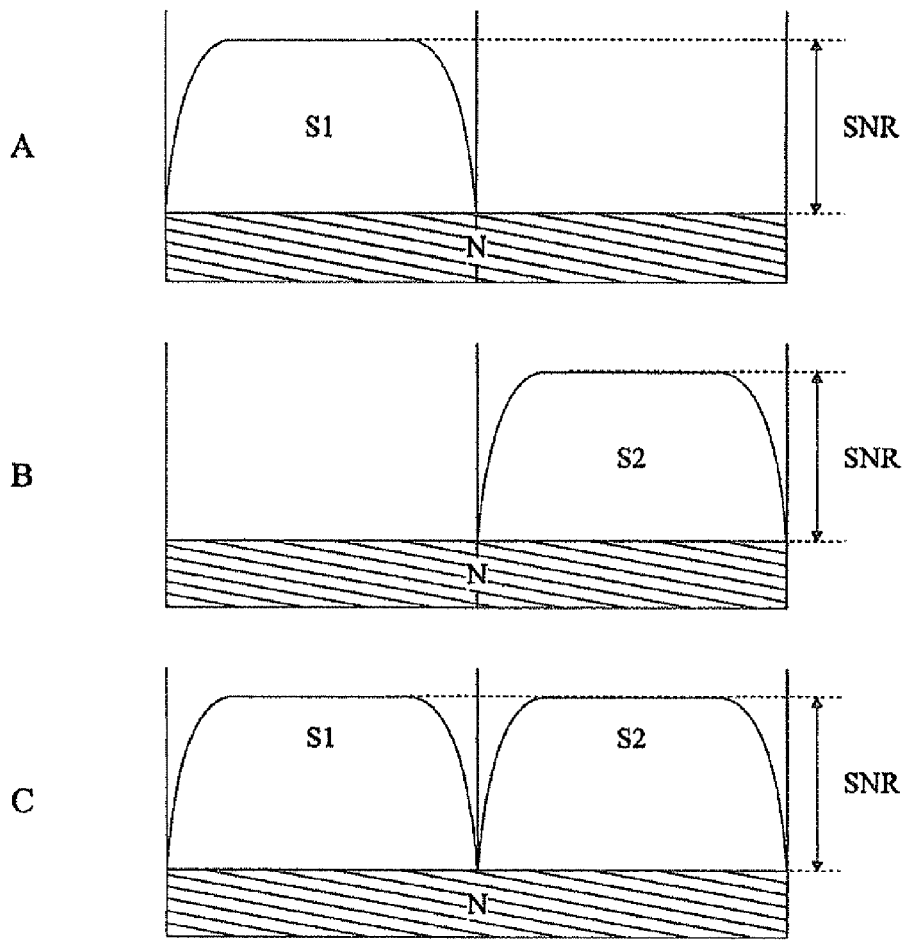
Figure 10:
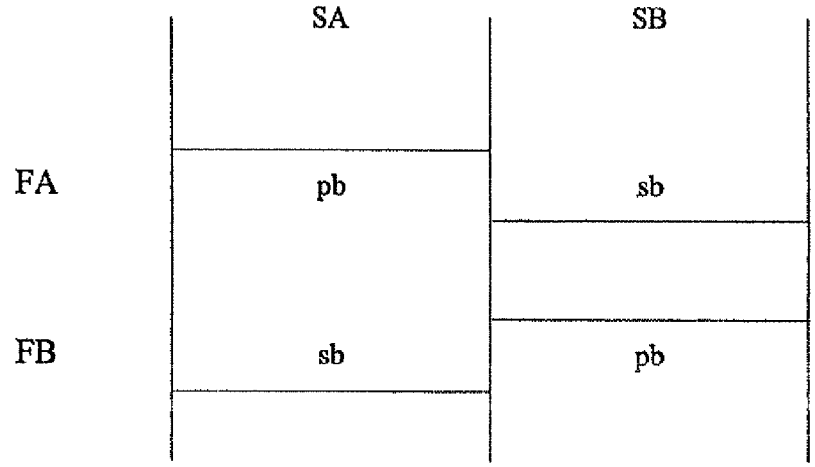

The invention will be described hereafter in a more detailed manner with reference to the drawings, wherein the figures show an example of an embodiment of the present invention. These figures show:

in FIG. 1, a functional block diagram of a transponder for a communications satellite;

in FIG. 2, the architecture of a satellite communications payload;

in FIG. 3, a conventional functional diagram of a combination of two uplink service areas into one single downlink service area, employing power combining;

in FIG. 4, a functional diagram of a combination of two uplink service areas into one single downlink service area, according to the present invention;

in FIG. 5, a functional diagram of a combination of two uplink service areas into one single downlink service area, according to the present invention, allowing a flexible allocation of bandwidth to each of the uplink service area, configured such that it allocates the full bandwidth and power to the uplink service area served by antenna 1a.

in FIG. 6, a functional diagram of a combination of two uplink service areas into one single downlink service area, according to the present invention, allowing a flexible allocation of bandwidth to each of the uplink service area, configured such that it allocates the full bandwidth and power to the uplink service area served by antenna 1b.

in FIG. 7, a functional diagram of a combination of two uplink service areas into one single downlink service area, according to the present invention, allowing a flexible allocation of bandwidth to each of the uplink service area, configured such that it allocates the one part of the available bandwidth and power to the uplink service area served by antenna 1a, and the rest of the available bandwidth and power to the uplink service area served by antenna 1b.

in FIG. 8 and FIG. 9, the spectra of the component (before combination, A and B) and composite (after combination, C) signals with and without employing the invention, respectively; and in FIG. 10, the filtering characteristics of the invention for the combination of two uplink service areas.

DETAILED DESCRIPTION

It is known that satellites include two subsystems, the platform and the payload. The platform supports the payload with the functions to constitute the structure including the development mechanisms for the antennae and solar arrays, the on board control system to ensure satellite autonomy, the electrical power system, the telecommand, telemetry and data handling system, the thermal control system and the attitude and orbital control system including the propulsion subsystem.

The payload is defined by the mission, which within the scope of this document shall be in general a communications mission. Typically a communications payload consists of a number of transponders the functional block diagram of which is given in FIG. 1.

In accordance to this figure, a transponder comprises an uplink antenna 1 with its associated service area, a low noise amplifier (LNA) 2, a converter 3, an input filter or demultiplexer 4, an amplification chain 5 including a channel amplifier 6 and a high power amplifier (HPA) 7, an output filter or multiplexer 8 and a downlink antenna 9 with its associated downlink service area. Not all functions need to be dedicated to a single transponder and certain functions can be shared by a number of transponders.

FIG. 2 shows a payload architecture to which the invention is specifically applicable. In this case, the system shown employs two uplink service areas with their associated uplink antennae 1a and 1b. Two uplink service areas is only an example and the principle can be extended indefinitely. The low noise amplifiers 2 and converters 3 are shared between several transponders (three transponders for each service area in this example). The input filter or demultiplexer 4 splits the input into the three transponder channels in this example, with bandwidth dedicated to each channel and each is processed by an amplification chain 5 which typically includes the channel amplifier 6 and the high power amplifier (HPA) 7. The amplified signals are then fed to the output filters 8 of an output multiplexer (OMUX) and a downlink antenna 9. Thus, the uplink service area through the uplink antenna 1a is common to one set of transponders (three in this example) while the uplink service area through the uplink antenna 1b is common to the other set of three transponders. In this example, the downlink service area is common to all the transponders.

In satellite communications the high power amplifier (HPA) 7 represents an important resource that is heavy and consumes most of the DC power in the payload. It is consequently a dimensioning factor of the satellite. It is important to use these resources efficiently. This is the object of the present invention. If small amounts of traffic exist from each uplink service area, this scheme necessitates two transponders even if the capacity of one transponder suffices. The functional block diagram for the configuration supporting connectivity with the uplink service areas (two in the given example) is shown in FIG. 3. It will be observed that two amplification chains must be employed even if the total capacity may be compatible with that of one amplification chain.

The present invention eliminates this disadvantage so that the number of required operational high power amplifiers is determined by the total capacity required rather than by the total capacity required and the connectivity requirements.

FIG. 4 shows the proposed functional diagram for a transponder that is capable of receiving signals from several service areas (two in this example), multiplexing the signals in the frequency domain to present a multiplexed signal to the amplification chain. In this regard, the input section up to the converter, i.e. the reception chains including respectively the uplink antennae 1a or 1b, the corresponding low noise amplifier (LNA) 2 and converter 3, is identical to the conventional case shown in FIG. 3. However, only one amplification chain 5 and one output filter is employed instead of as many as the number of associated uplink service areas. This is a considerable advantage as already explained.

The main difference is the use of an input multiplexer 10. In its basic form, the input multiplexer could be a power combiner where the power from all uplink service areas is added. The signal orthogonality is assured operationally where part of the spectrum is assigned to one service area and another part of the spectrum is assigned to the other uplink service area(s). The problem in this case is twofold:

Operational errors will lead to one service area interfering with the other reducing the system integrity and The figure of merit (also called G/T) for the uplink is degraded for all service areas reducing the performance which would require larger uplinking earth stations. Improvement of the G/T is difficult.

Power addition implies addition of the spectra from all uplink service areas. The signal orthogonality is assured by the operational segregation of signals so that by barring operational errors, mutual interference is avoided.

FIGS. 5, 6 and 7 show the proposed functional diagram for a transponder that is capable of receiving signals from several service areas (two in this example), transmitting signals from either one of the two uplink service areas, or from both service areas, and for distributing those signals on the downlink side according to varying actual needs, by means of the invention. This functional diagram enables the advantages brought by the input multiplexer 10, while maintaining the possibility to allocate the fill available bandwidth and power to either one of the two uplink service areas. This is additional flexibility in case the satellite designer does not know a priori whether one of the two uplink service areas might require the full resources. To that purpose, filters 4a and 4b have identical bandwidth characteristics; the spectrum associated to the passband of filters 4a and 4b corresponds to the envelope of the spectra associated to the passband covered by multiplexer 10.

In FIG. 5, switches 11a and 11b at the input of filters 4a and 4b and multiplexer 10, and switches 12a and 12b at the output of filters 4a and 4b and multiplexer 10 are configured such that the transmitted signals are coming only from antenna 1a. The whole available spectrum and power are thus allocated to the service area corresponding to antenna 1a.

In FIG. 6, switches 11a and 11b at the input of filters 4a and 4b and multiplexer 10, and switches 12a and 12b at the output of filters 4a and 4b and multiplexer 10 are configured such that the transmitted signals are coming only from antenna 1b. The whole available spectrum and power are thus allocated to the service area corresponding to antenna 1b.

In FIG. 7, switches 11a and 11b at the input of filters 4a and 4b and multiplexer 10, and switches 12a and 12b at the output of filters 4a and 4b and multiplexer 10 are configured such that the transmitted signals are coming from both antenna 1a and antenna 1b, and combined through multiplexer 10. The spectrum and power are thus allocated to the service area corresponding to antenna 1b. Part of the spectrum is assigned to that service area associated to antenna 1a and another part of the spectrum is assigned to the other uplink service area associated to antenna 1a.

Of course, it is possible to further extend this functional diagram to different allocations of spectrum to different service areas (splits of half the spectrum to each service area, or one third/two thirds, or one fourth/three fourth, according to the operational and commercial requirements). It is also possible to further extend the proposed invention to more than two uplink service areas.

Power addition also implies addition of the noise from all uplinks so that the uplink signal to noise ratio is reduced. For example, if the G/T of each service area is similar, power combination of two service areas would degrade the G/T by typically 3 dB. This is shown in FIG. 8 where A represents the spectrum of the signal from one service area, B from the other and C represents the spectrum after power addition of both signals. The uplink signal components are represented by S1 and S2, the noise by N and the signal to noise ratio as SNR. Note that the SNR in C is lower than the SNR in A and B.

In the same example, if the G/T of the two service area is different, power combination of two service areas would degrade the G/T of the high performance service area significantly (>3 dB) and the G/T of the low performance service area less significantly (<3 dB). This is often operationally unacceptable.

The invention employs frequency multiplexing using filters, thus the name Uplink Frequency Multiplexing. This is shown in FIG. 9 and FIG. 10. The spectrum SA assigned to one service area A, corresponds to the passband pb of input filter FA, utilised with service area A while the spectrum SB assigned to the other service area B, corresponds to the stopband sb of the same input filter FA. Input filter FB for service area B is similarly specified. This scheme eliminates both disadvantages given above.

The fact that filters are employed means that operational errors will not reduce the system integrity. An uplink signal from one service area with a frequency assigned to the other service area(s) will not cause interference since it will fall in the stopband of the associated filter.

Moreover, only the noise associated with the spectrum assigned to one service area is allowed to pass through the system. There is no additional noise as in the power combiner case and therefore there is no significant degradation of the G/T. In FIG. 9, the SNR in C is of the same order as the SNR in A and B.

The communication system according to the invention has important advantages:

Uplink connectivity becomes an independent feature relative to the transponder assignment. This gives the opportunity to utilise the amplifying chain to its full power/capacity potential representing a better optimal use of the satellite resources.

The Uplink Frequency Multiplexer employing filters as described above ensures the robustness and integrity of the system. Uplinks from a given service area outside the spectrum assigned to that given service area are rejected and do not cause interference in the other service area.

Similarly the filters of a given service area reject the noise from the other service area so that there is no degradation in the G/T. Thus the requirements of the uplinking earth station are not increased and do not affect the cost or the market acceptability of the system.

Its implementation could be realised employing conventional technology without requiring a significant development and with minimal cost, risk and schedule impact. It also represents a minimal risk impact on the satellite programme.

The system can be extended with different combinations of filters at the input multiplexer so that the passband associated to each uplink service area can be adjusted to fit the commercial and marketing requirements throughout the satellite lifetime.

The system can also be employed to segment a given uplink service area into several sub areas, each sub areas benefiting from an increased antenna gain and thus a better G/T. The G/T can be adjusted to the actual needs of different parts of a given area, at no detriment to the power and frequency resources.

The invention claimed is:

1. A satellite-borne transponder for two or more uplink service areas, comprising:
    at least two uplink antennae,
    one low noise amplifier and one converter for each uplink antenna,
    at least one input filter,
    at least one amplification chain, each amplification chain including a channel amplifier, a high power amplifier, and an output filter,
    a downlink antenna for an associated downlink service area,
    means for associating at least one of the at least two uplink antennae to an uplink service area, the number of uplink antennae associated being determined by a preset Figure of Merit for each associated uplink service area, and
    at least one input multiplexer including at least as many passband filters as reception chains, each reception chain including an uplink antenna and a low noise amplifier, and a converter linked to the input multiplexer, each of the passband filters having a passband adjusted to an associated uplink service area and at least one stopband associated with the other uplink service areas.

2. The satellite-borne transponder according to claim 1, wherein
    the input multiplexer has a frequency spectrum that is divided into at least as many partial spectra as uplink antennae are linked to the multiplexer,
    the passbands of all passband filters, when aggregated, correspond to the spectrum of the input multiplexer, and
    the input multiplexer is connected to the high power amplifier of one of the amplification chains.

3. The satellite-borne transponder according to claim 1, comprising a plurality of input filters and input multiplexers, and a plurality of switches for flexible allocation of spectrum and power to uplink service areas connected to the uplink antennae.

4. The satellite-borne transponder according to claim 1, wherein the Figure of Merit for different downlink service areas is at least maintained while communications over the downlink service areas share, on the downlink, power and frequency band, through a plurality of filters, input multiplexers, and switches.

5. The satellite-borne transponder according to claim 1, comprising a plurality of input filters and input multiplexers, and switches for flexible allocation of spectrum and power to uplink service areas connected to uplink antennae, with no degradation of the Figure of Merit for each of the uplink service areas.

6. The satellite-borne transponder according to claim 1, wherein the Figure of Merit for an uplink service area is augmented by dividing the uplink service area into a plurality of sub areas, through a plurality of uplink antennae and input multiplexers.

7. The satellite-borne transponder according to claim 1, wherein power and frequency band requirements for each service area are flexibly allocated to any of the uplink and downlink service areas in order to fulfill needs over each uplink and downlink service area, through a plurality of input filters, input multiplexers, and switches.

8. A satellite communication system for at least two uplink service areas, comprising a satellite-borne transponder according to claim 1.

9. The satellite-borne transponder according to claim 2, comprising a plurality of input filters and input multiplexers, and a plurality of switches for flexible allocation of spectrum and power to uplink service areas connected to the uplink antennae.

* * * * *